US012751889B2

(12) United States Patent
Li et al.

(10) Patent No.: US 12,751,889 B2
(45) Date of Patent: Oct. 6, 2026

(54) MULTI-FUNCTIONAL MASSAGER

(71) Applicant: Xiamen Comfier Technology Co., Ltd., Fujian (CN)

(72) Inventors: Jianqing Li, Fujian (CN); Song Yang, Fujian (CN); Zhicheng Zhang, Fujian (CN)

( * ) Notice: Subject to any disclaimer, the term of this patent is extended or adjusted under 35 U.S.C. 154(b) by 562 days.

(21) Appl. No.: 18/277,381

(22) PCT Filed: Jun. 16, 2022

(86) PCT No.: PCT/CN2022/099088

§ 371 (c)(1),
(2) Date: Aug. 16, 2023

(87) PCT Pub. No.: WO2022/262795

PCT Pub. Date: Dec. 22, 2022

(65) Prior Publication Data

US 2024/0122787 A1 Apr. 18, 2024

(30) Foreign Application Priority Data

Jun. 18, 2021 (CN) ........................ 202121366467.X

(51) Int. Cl.
*A61H 15/00* (2006.01)
*A61H 15/02* (2006.01)

(52) U.S. Cl.
CPC ......... *A61H 15/0078* (2013.01); *A61H 15/02* (2013.01); *A61H 2201/0161* (2013.01); *A61H 2205/106* (2013.01); *A61H 2205/12* (2013.01)

(58) Field of Classification Search
CPC .......... A61H 7/00; A61H 7/002; A61H 7/004; A61H 7/007; A61H 15/00; A61H 15/0078; A61H 15/02; A61H 2015/0007; A61H 2015/0014; A61H 2015/0028; A61H 2015/0042; A61H 35/006; A61H 2201/01; A61H 2201/0119; A61H 2201/0138; A61H 2201/0149; A61H 2201/02;

(Continued)

(56) References Cited

U.S. PATENT DOCUMENTS 5,728,051 A * 3/1998 Chi ........................ A61H 7/004
601/28
6,390,107 B1 * 5/2002 Lin ........................ A45B 25/18
135/25.4

(Continued)

FOREIGN PATENT DOCUMENTS

CN 102178594 A * 9/2011
CN 105919781 A * 9/2016 ........... A61H 9/0078

(Continued)

*Primary Examiner* — Colin W Stuart
(74) *Attorney, Agent, or Firm* — Birchwood IP

(57) ABSTRACT

A multi-functional massager, including a foot massage mechanism and a leg massage mechanism; the foot massage mechanism has a foot massage assembly provided within a first housing to provide foot massage, and the leg massage mechanism has two adjacent slots formed within a second housing; massage airbags are provided in the slots; two sides of the second housing is rotatably connected to two side surfaces of the first housing. Accordingly, simultaneous foot and leg massage can be achieved, and the massager can be folded in a storage position to form a footstool.

8 Claims, 10 Drawing Sheets

(58) Field of Classification Search
CPC .... A61H 2201/0207; A61H 2201/0221; A61H 2201/10; A61H 2201/164; A61H 2201/1642; A61H 2201/0161; A61H 2203/0425; A61H 2203/0431; A61H 2205/10; A61H 2205/106; A61H 2205/12
See application file for complete search history.

(56) References Cited

U.S. PATENT DOCUMENTS

| | | | | |
|---|---|---|---|---|
| 6,572,514 | B1 * | 6/2003 | Calafato | A63B 22/16 482/79 |
| 2008/0167589 | A1 * | 7/2008 | Fung | A61H 23/0254 601/107 |
| 2012/0095375 | A1 * | 4/2012 | Ishiguro | A61H 15/0078 601/112 |
| 2012/0246820 | A1 * | 10/2012 | Huynh | A61H 35/006 4/524 |
| 2018/0344000 | A1 * | 12/2018 | Humphrey | A45D 29/20 |

FOREIGN PATENT DOCUMENTS

| | | | | | |
|---|---|---|---|---|---|
| CN | 107007446 | A | * | 8/2017 | A61H 15/0078 |
| CN | 107595603 | A | * | 1/2018 | A47C 3/16 |
| CN | 209075413 | U | * | 7/2019 | |
| CN | 209121635 | U | | 7/2019 | |
| JP | 5892884 | B2 | * | 3/2016 | A61H 9/0078 |

* cited by examiner

MULTI-FUNCTIONAL MASSAGER

BACKGROUND OF THE INVENTION

The present invention relates to the technical field of massage apparatus, and more specifically relates to a multi-functional massager.

With the acceleration of people's pace of life and increasing work pressure, the level of physical fatigue has been continuously rising. In order to effectively relieve foot fatigue, various fatigue relief devices have emerged, and one of them is leg and foot massager, which can be used independently or in conjunction with a massage chair.

A prior art leg and foot massage device includes a foot massage assembly for massaging the feet, and a leg massage component provided on the foot massage assembly for massaging the legs. In the prior art leg and foot massage device, the leg massage component is fixedly provided at a rear end of the foot massage assembly, and the two components cannot be folded against each other. Therefore, the overall size of this kind of leg and foot massage device is large, making storage difficult, and moreover, this kind of massage device is mono-functional.

In addition, when using the leg and foot massage device, since the foot massage device is generally placed on the ground and the leg massage component is vertically provided at the rear end of the foot massage assembly, the users can only keep their feet and calves in a perpendicular position and maintain a fixed massage posture during use. The leg and foot massage device is unable to properly adjust its angle according to the sitting position or the placement status of the legs, therefore it has certain limitations.

BRIEF SUMMARY OF THE INVENTION

The present invention aims to provide a multi-functional massager that simultaneously massages the feet and calves, and can be folded to form a footstool in a storage position, and also provides a thermal therapy function, thereby greatly enhancing its utility.

In order to achieve the above objects, the present invention adopts the following solutions:

A multi-functional massager, comprising a foot massage mechanism configured for foot massage, and a leg massage mechanism configured for calf massage; wherein the foot massage mechanism comprises a foot massage assembly provided within a first housing of the massager to provide foot massage; the leg massage mechanism comprises two adjacent slots configured to accommodate legs of a user, and the two slots are formed within a second housing of the massager; massage airbags are provided in the slots; two sides of the second housing are rotatably connected to two sides of the first housing; the second housing, when rotated upward, stands vertically at a rear end of the first housing and being positioned perpendicularly with respect to the first housing; the second housing, when rotated downward, is horizontally positioned and closed against a top side of the first housing; a thermal therapy assembly is provided on an outer side of the second housing.

Further, a support frame is rotatably connected to a bottom surface of the first housing; the support frame, when rotated outward away from the bottom surface of the first housing, supports the bottom surface of the first housing with a tilted position with respect to the bottom surface of the first housing, so that the first housing and the second housing tilt backward with respect to a level ground; the support frame, when rotated inward towards the bottom surface of the first housing, is stored within the bottom surface of the first housing.

Further, a receiving recess which accommodates the support frame is formed on the bottom surface of the first housing; connection shaft sleeves are provided at two ends of the support frame respectively; rotational axles that pass through the connection shaft sleeves respectively are installed on two sides of a front part of the receiving recess respectively; two limiting protrusions are formed on an outer circumferential surface of each of the connection shaft sleeves; stopping protrusions are formed within the receiving recess and are positioned adjacent and below the rotational axles respectively; one of the limiting protrusions of each of the connection shaft sleeves engage with an inner side surface or an outer side surface of a corresponding stopping protrusion when the connection shaft sleeves are rotated away from the bottom surface of the first housing to achieve an inclined supporting position of the support frame or rotated towards the bottom surface of the first housing to achieve a storage position of the support frame respectively, thereby achieving position limitation of the support frame in the inclined supporting position and the storage position.

Further, the support frame comprises a U-shaped handle part, and the connection shaft sleeves are provided at two ends of the handle part respectively; the limiting protrusions and the stopping protrusions have arc-shaped contours.

Further, the first housing comprises an upper shell, a lower shell, and a middle shell placed above the lower shell; two pockets configured for user's feet to enter are formed on a top surface of the upper shell; two openings are provided on a surface of the middle shell corresponding to the pockets; the foot massage assembly is positioned within the lower shell, and two massage head sets are provided in the foot massage assembly and are positioned under the two openings respectively.

Further, the foot massage assembly comprises a driving unit and said two massage head sets; the driving unit comprises a motor and a gear set driving a rotating shaft to rotate; rotating wheels are installed at two ends of the rotating shaft respectively; the rotating wheels are rotatable along with the rotating shaft; an eccentric cam is eccentrically provided on each of the rotating wheels and projected out of the rotating wheel; each of the massage head sets comprises a front massage head and a rear massage head, which are positioned respectively on two opposite sides of the rotating shaft; and massage arms where the front massage head and the rear massage head are installed respectively sleeve onto the eccentric cam; sliding grooves are formed at lower edges of the front massage head and the rear massage head respectively in each massage head set, and limiting shafts are provided on the lower shell, and the limiting shafts pass through the sliding grooves respectively; the front massage head and the rear massage head of each massage head set are driven to perform a compound motion of back-and forth movement and/or up-and-down motion under constraint of the corresponding limiting shafts.

Further, an operating shell is provided in a middle of the second housing, and the two slots are formed at two sides of the operating shell respectively; a receiving groove is formed in a middle of the upper shell of the first housing between the two pockets; the operating shell of the second housing fits into the receiving groove when the second housing is closed against the top side of the first housing.

Further, the second housing comprises a back shell, and side shells extending perpendicularly from two ends of the back shell; inner walls of the side shells of the second housing are rotatably connected to two side walls of the upper shell of the first housing; the back shell of the second housing is positioned on a rear side of the upper shell when the second housing is rotated upright; the back shell of the second housing is positioned above the upper shell and closes against the upper shell when the second housing is rotated downward and closes against the top side of the first housing.

Further, the massage airbags provided for each of the slots comprise a back airbag provided on a front wall surface of the back shell, and side airbags provided on an inner wall of a corresponding side shell and a corresponding side wall of the operating shell.

Further, the thermal therapy assembly comprises a heating sheet and a soft pad provided on the outer side of the second housing, where the heating sheet is positioned on the soft pad.

With the above structure, the present invention achieves foot and calf massage by rotatably connecting the leg massage mechanism above the foot massage mechanism, allowing both mechanisms to be operational in an open state. Also, by unfolding the support frame, the placement angle of the massager can be adjusted to suit the user's needs. When not massaging, the leg massage mechanism can be folded onto the foot massage mechanism, thus reducing the storage volume while enabling the massager to serve as a footstool. Further, the multi-functional massager can further provide the thermal therapy function, thus providing various functionalities and greatly enhancing its utility.

DETAILED DESCRIPTION OF THE INVENTION

Figure 1:
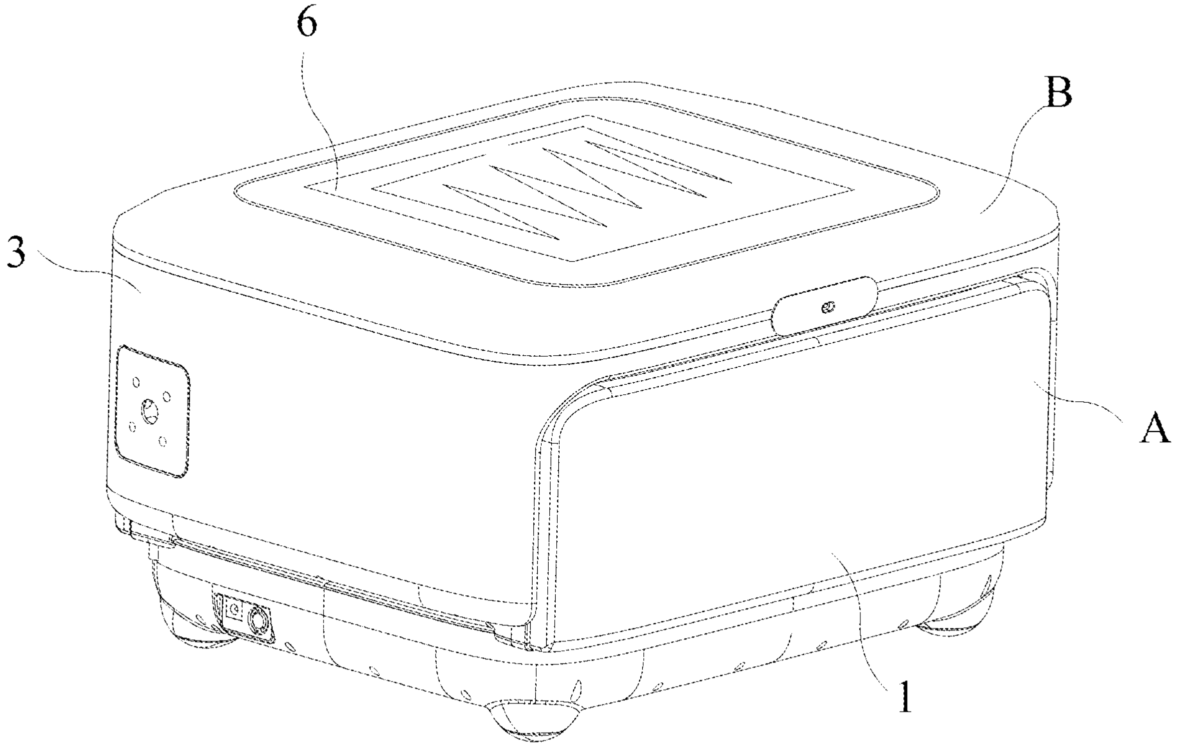
FIG. 1 is a schematic diagram of the three-dimensional structure of the present invention (as a footstool)

In order to further explain the technical solutions of the present invention, the present invention will be explained in detail by the specific embodiments.

Referring to FIGS. 1 to 4, the present invention discloses a multi-functional massager, comprising a foot massage mechanism A for massaging the feet, and a leg massage mechanism B for massaging the calves. The foot massage mechanism A comprises a foot massage assembly 2 provided within a first housing 1 and configured to provide massages for the feet; the leg massage mechanism B comprises two adjacent slots 31 formed within a second housing 3 and configured to accommodate legs of a user; massage airbags 4 are provided in the slots 31.

Figure 3:
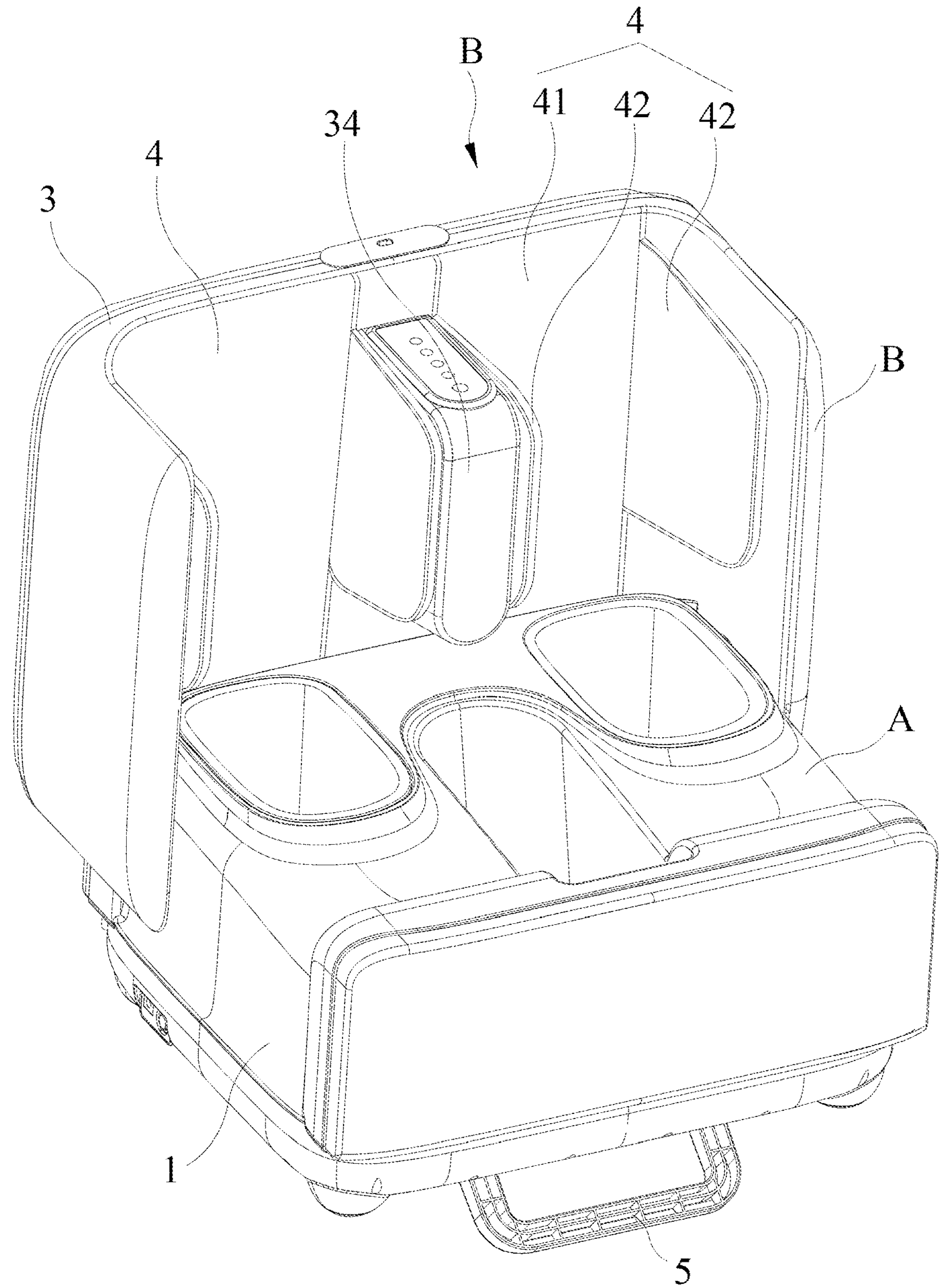
FIG. 3 is yet another schematic diagram of the three-dimensional structure of the present invention (as a foot and leg massager)
Figure 4:
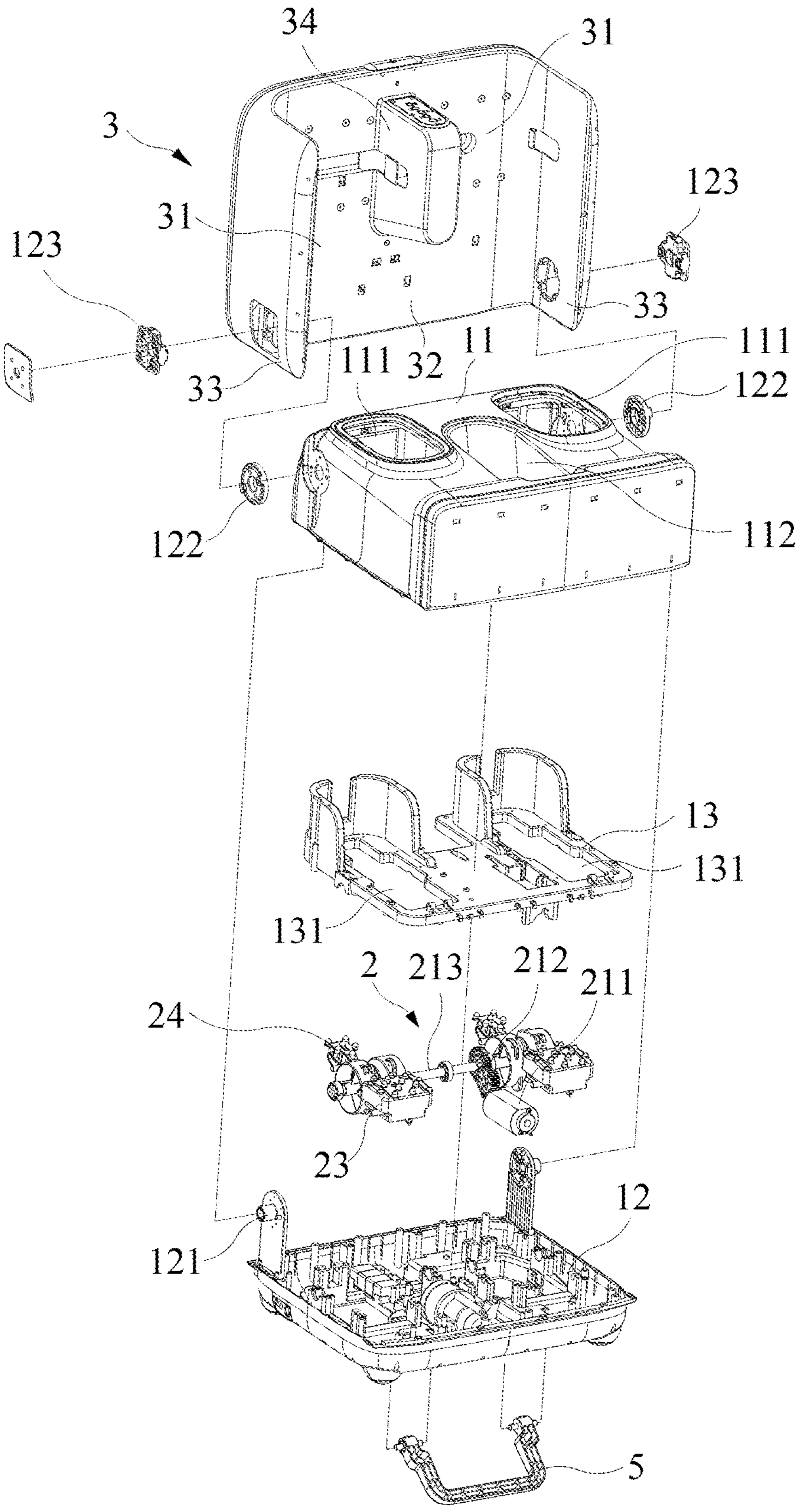
FIG. 4 is an exploded view of the structure of the present invention.
Figure 5:
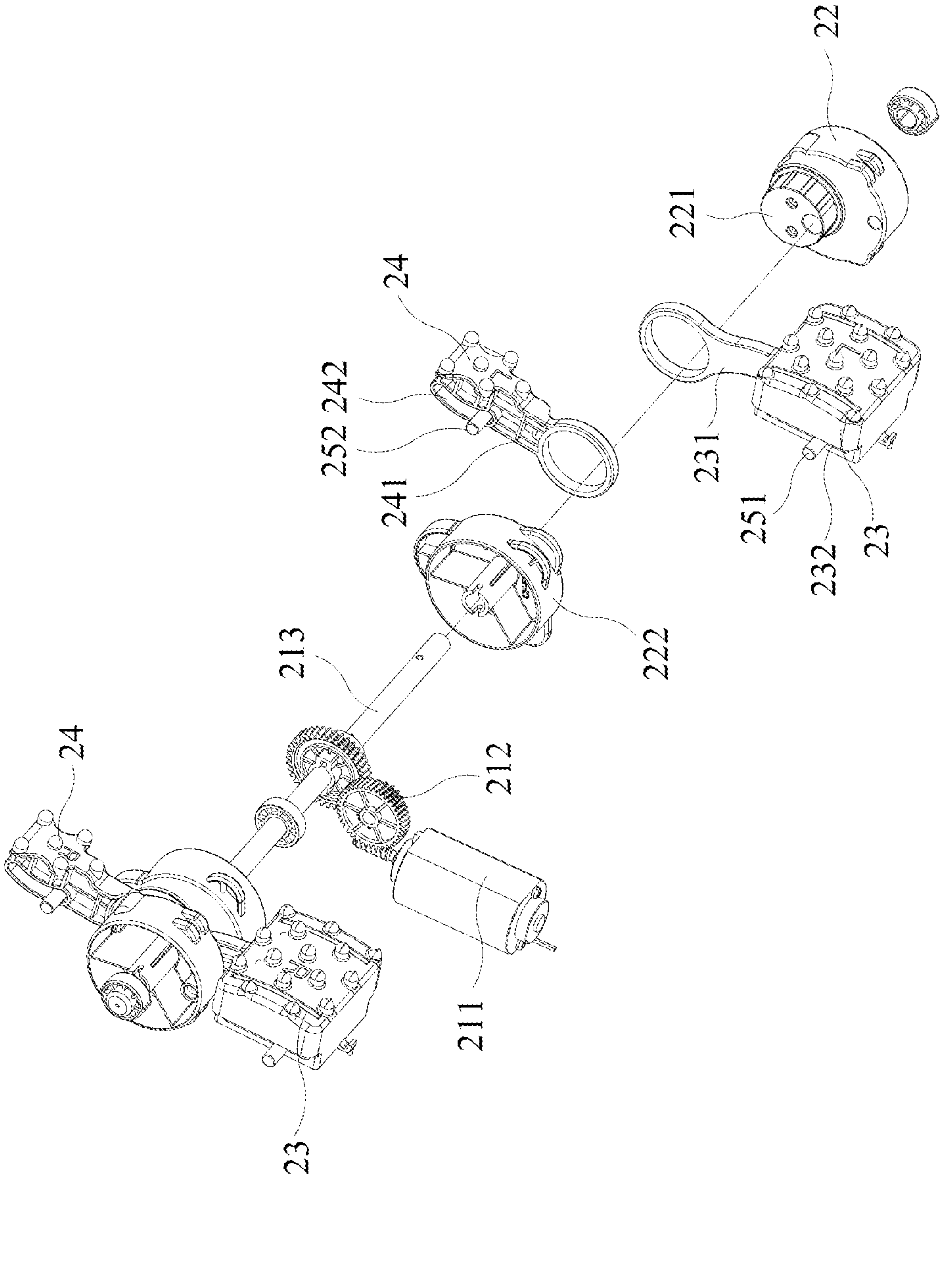
FIG. 5 is a structural view of the foot massage assembly of the present invention (one side of the foot massage assembly is also shown in an exploded manner)
Figure 6:
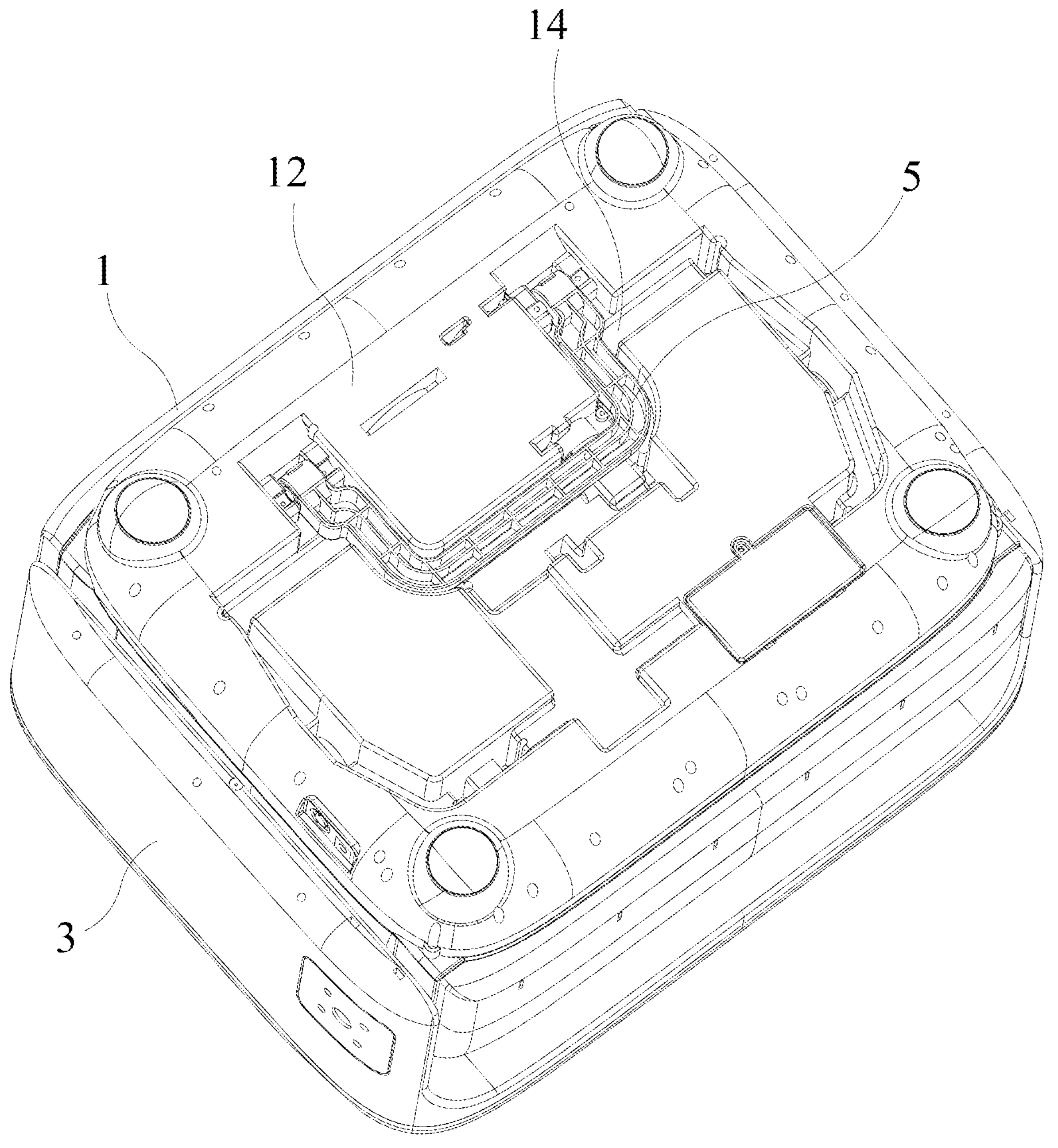
FIG. 6 is a schematic bottom view of the present invention.
Figure 7:
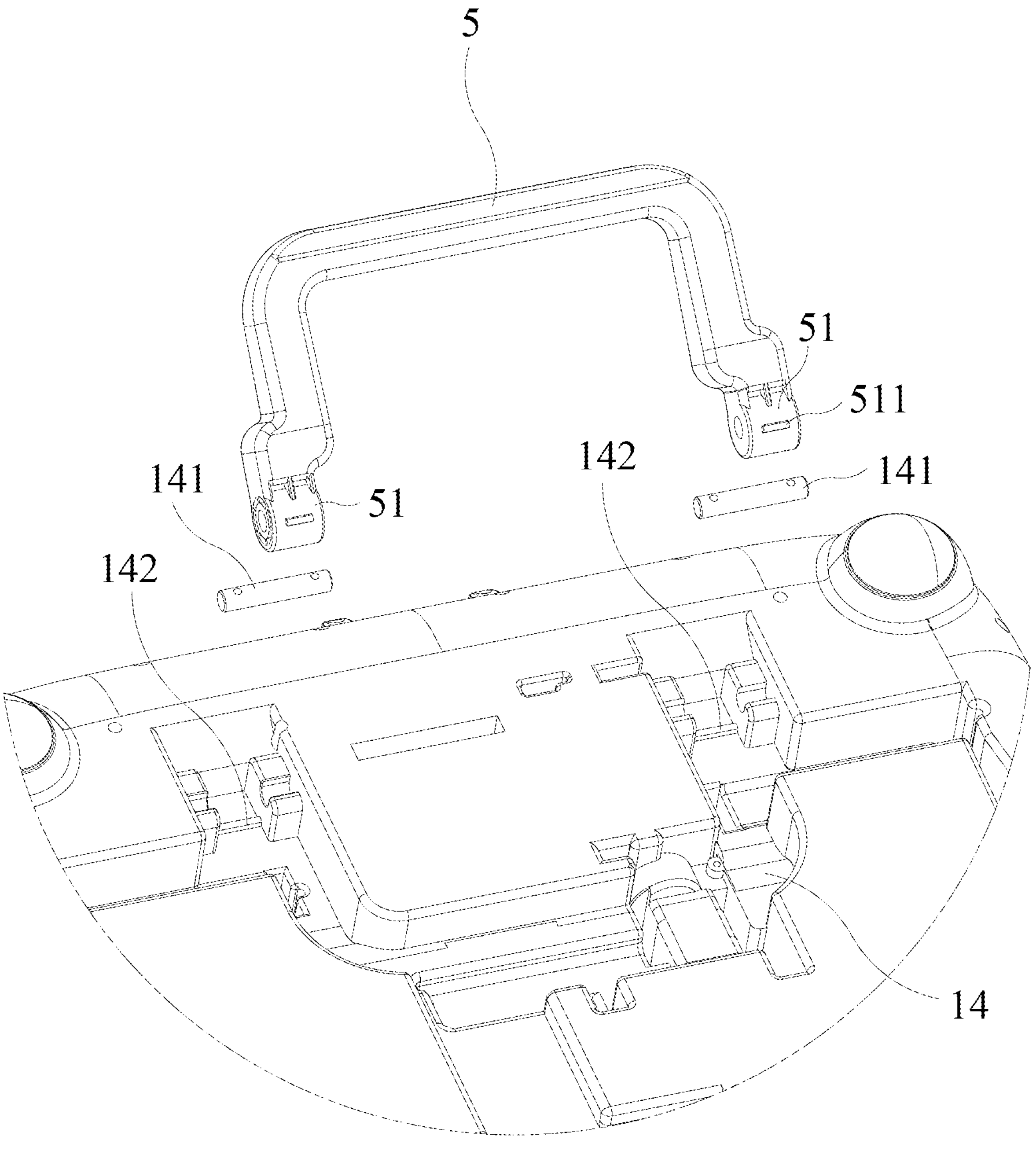
FIG. 7 shows an exploded view of the structure of the support frame on the bottom surface of the present invention.
Figure 8:
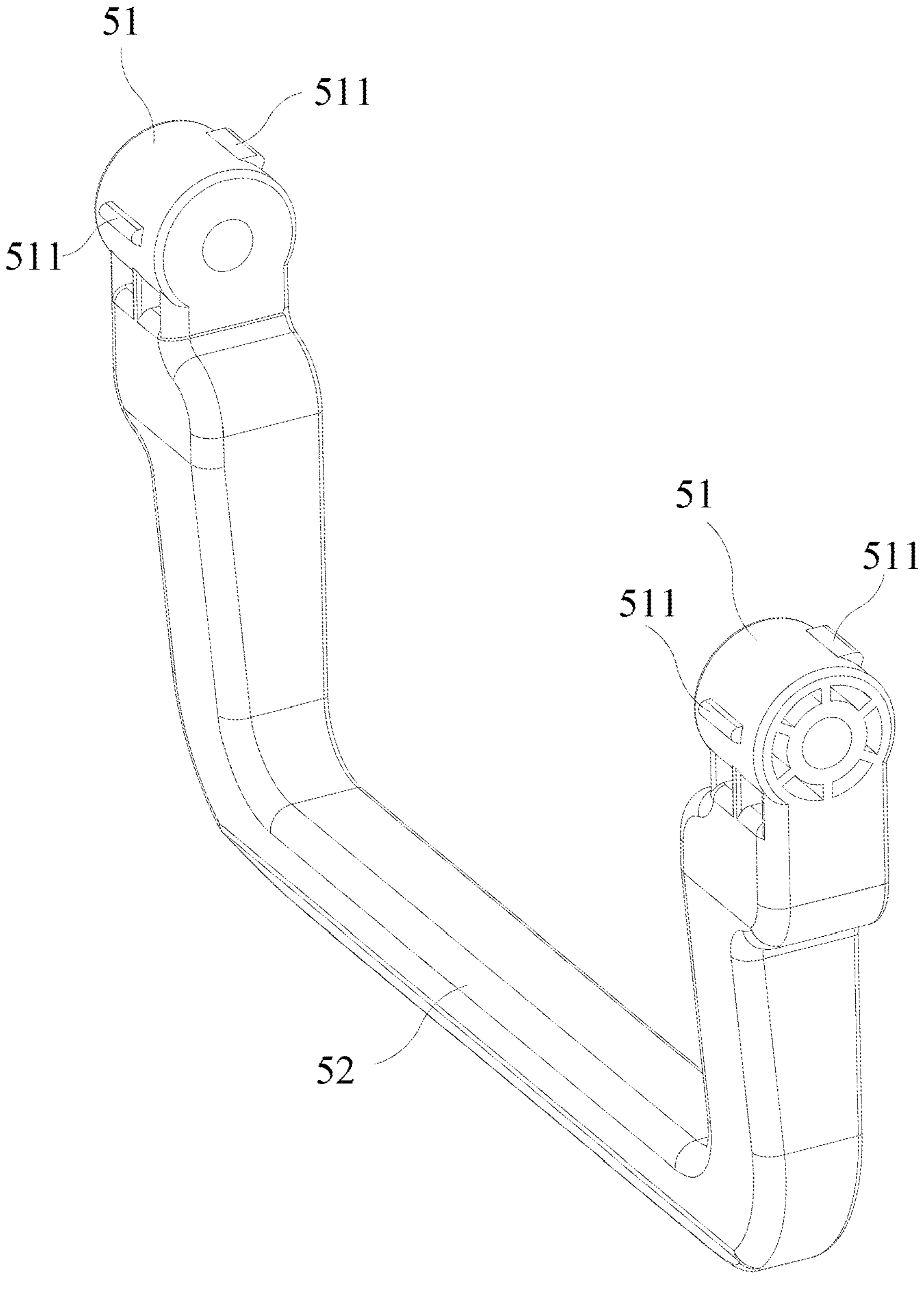
FIG. 8 is a schematic structural diagram of the support frame in the present invention.
Figure 9:
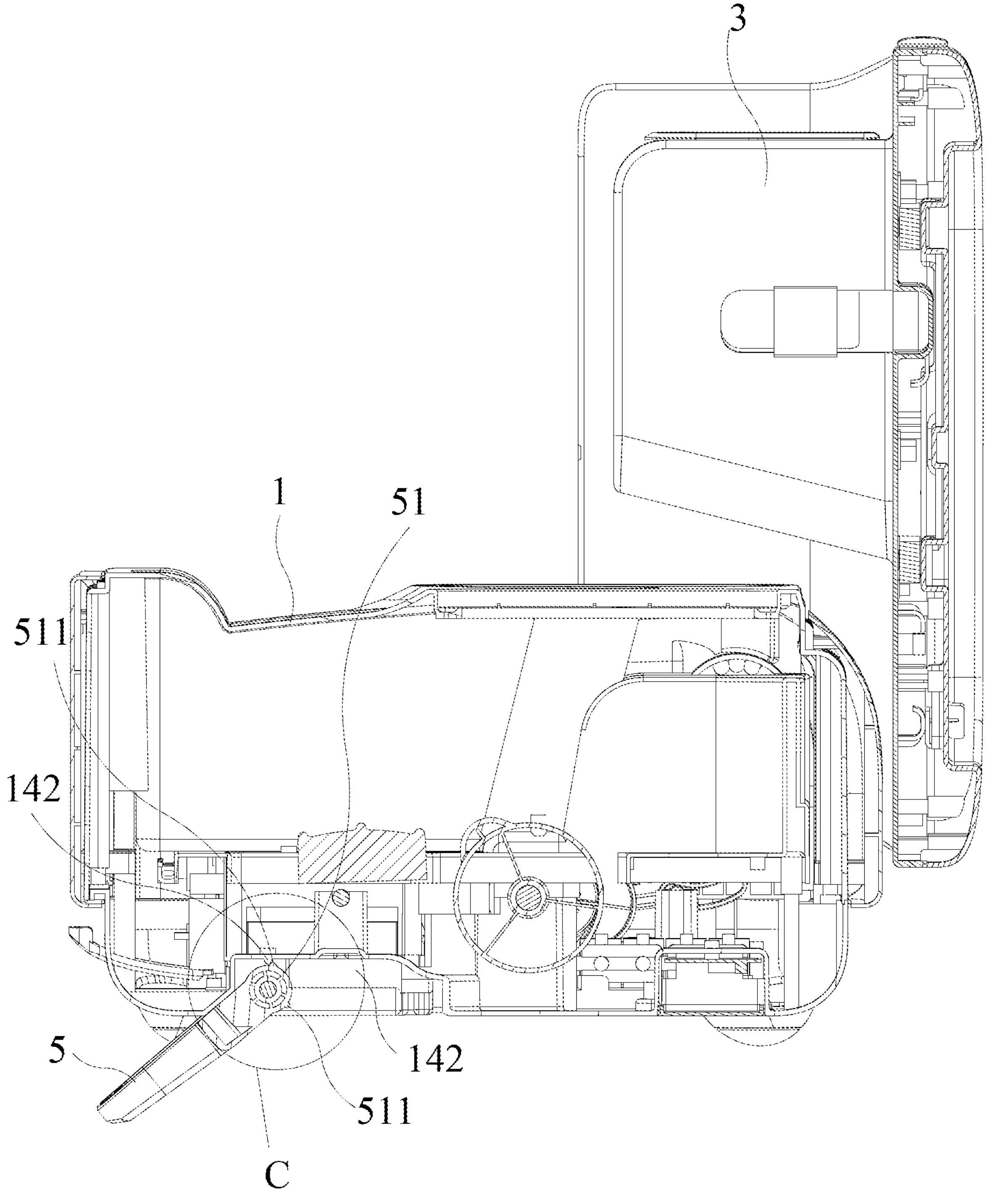
FIG. 9 is a schematic structural diagram of the support frame of the present invention in an inclined supporting position.
Figure 10:
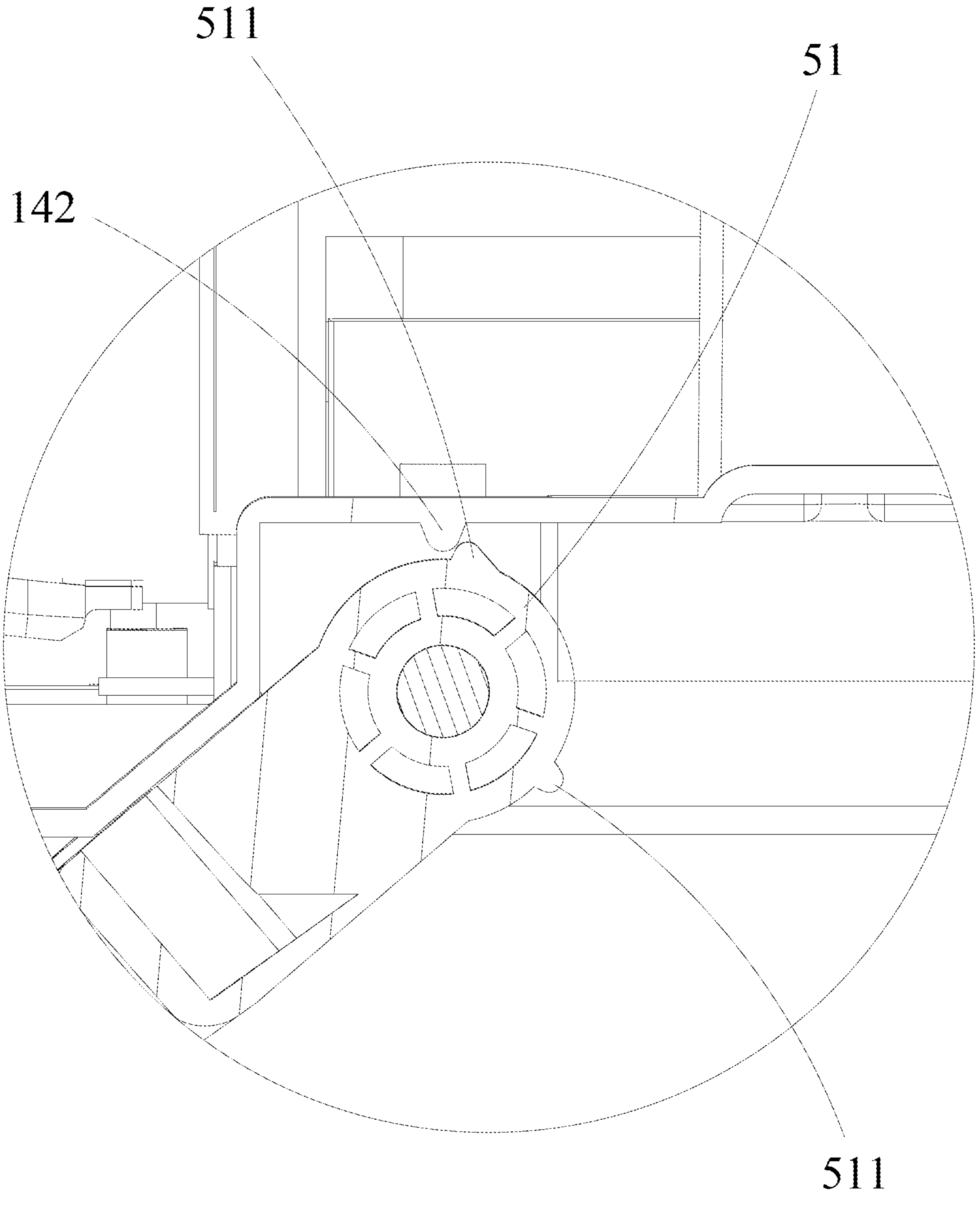
FIG. 10 is a partially enlarged view of portion C in FIG. 9.

Referring to FIGS. 3 to 5, in the foot massage mechanism, the first housing 1 comprises an upper shell 11, a lower shell 12, and a middle shell 13 placed above the lower shell 12; two pockets 111 configured for the feet to enter are formed on a top surface of the upper shell 11, and during use, removable foot sleeves are used to form the pockets 111. Two openings 131 are provided on a surface of the middle shell 13 below the pockets 111; the foot massage assembly 2 is positioned within the lower shell 12, and two massage head sets are provided in the foot massage assembly 2 and are positioned under the two openings 131 respectively. The foot massage assembly 2 comprises a driving unit and said two massage head sets. The driving unit comprises a motor 211 and a gear set 212 driving a rotating shaft 213 to rotate. Rotating wheels 22 are installed at two ends of the rotating shaft 213 respectively; the rotating wheels 22 are rotatable along with the rotating shaft 213. An eccentric cam 221 is eccentrically provided on each rotating wheel 22 and projected out of the rotating wheel 22. Each of the massage head sets comprises a front massage head 23 and a rear massage head 24, which are positioned respectively on two opposite sides of the rotating shaft 213; and massage arms 231 and 241 where the front massage head 23 and the rear massage head 24 are installed sleeve onto the eccentric cam 221. A stopper wheel 222 may be provided on a side surface of each eccentric cam 221 for positioning the eccentric cam 221. Further, sliding grooves 232 and 242 are formed at lower edges of the front massage head 23 and the rear massage head 24 respectively in each massage head set, and limiting shafts 251 and 252 are provided on the lower shell 12, and the limiting shafts 251 and 252 pass through the sliding grooves 232 and 242 respectively. The front massage head 23 and the rear massage head 24 of each massage head set are driven to rotate eccentrically by a corresponding eccentric cam 221 while moving back and forth under the constraint of the corresponding limiting shafts 251 and 252. At least one of the sliding grooves can be shaped as an arc to create an up-and-down motion. In this embodiment, the sliding groove 242 of the rear massage head 24 of each massage head set is formed as an arc-shaped groove, thus allowing the rear massage head to perform a compound motion of back-and-forth movement and up-and-down motion driven by a corresponding rotating wheel 22. During use, the feet of the user are inserted through the pockets 111 and placed on the openings 131. The front massage head 23 and the rear massage head 24 of each massage head set provide massages to the sole of a corresponding foot, thus achieving foot massage.

For the leg massage mechanism, the second housing 3 comprises a back shell 32, and side shells 33 extending perpendicularly from two ends of the back shell 32; an operating shell 34 is provided in a middle of the second housing 3, and the two slots 31 are formed at two sides of the operating shell 34 respectively. An operating area is formed on the operating shell 34; control components can be provided within the operating shell 34, and control buttons can be provided on the operating shell 34 for the convenience of the user to operate. The massage airbags are provided on all three walls of each of the slots 31 of the second housing 3. In this embodiment, the massage airbags 4 provided for each of the slots comprise a back airbag 41 provided on a front wall surface of the back shell 32, and side airbags 42 provided on an inner wall of a corresponding side shell 33 and a corresponding side wall of the operating shell 34. An air pump, an air vent valve, and an air pipe are provided inside each airbag to inflate the airbag. By setting up the massage airbags 4, the legs can be more effectively enveloped and fixed in position, and a large area of compression and vibration massage are provided to the calves through the airbags and their inflating mechanisms achieved by said air pump, said air vent valve, and said air pipe provided inside each airbag. This effectively relaxes and massages the leg muscles.

In the present invention, to enable the massager to be foldable for compact storage while increasing its functionality, two sides of the second housing 3 are rotatably connected to two sides of the first housing 1, and the second housing 3, when rotated upward, stands vertically at a rear end of the first housing 1 and being positioned perpendicularly with respect to the first housing 1, thus forming the leg massage mechanism at a rear side of the foot massage mechanism, as shown in FIG. 3. Also, the second housing 3, when rotated downward, can be horizontally positioned and closed against a top side of the first housing 1 to form a footstool, as shown in FIG. 1. During assembly, inner walls of the side shells 33 of the second housing 3 are rotatably connected to two side walls of the upper shell 11 of the first housing 1 respectively. The back shell 32 of the second housing 3 is positioned on a rear side of the upper shell 11 when the second housing 3 is rotated upright, and the back shell 32 is positioned above the upper shell 11 and closes against the upper shell 11 when the second housing 3 is rotated downward and closes against the top side of the first housing 1. As shown in FIG. 4, first rotational axles 121 are protruded from the two side walls of the upper shell 11 of the first housing 1. In this embodiment, the first rotational axles 121 are secured to the lower shell 12, and the first rotational axles 121 pass through the two side walls of the upper shell 11 respectively. Each of the first rotational axles 121 is mounted with a first rotary part 122; a second rotary part 123 corresponding to the first rotary part 122 is provided on the inner wall of a corresponding side shell 33 of the second housing 3, and the second rotary part 123 sleeves the first rotary part 121 and is positioned at an outer side of the first rotary part 121; the second rotary part 123 rotates relative to the corresponding first rotary part 122. Rotation of the second rotary part 123 is limited by the corresponding first rotary part 122, so that the second rotary part 123 can only be rotated up to 90 degrees.

Further, a receiving groove 112 is formed in a middle of the upper shell 11 of the first housing 1 between the two pockets 111. The operating shell 34 of the second housing 3 fits into the receiving groove 112 when the second housing 3 is closed against the top side of the first housing 1.

Figure 2:
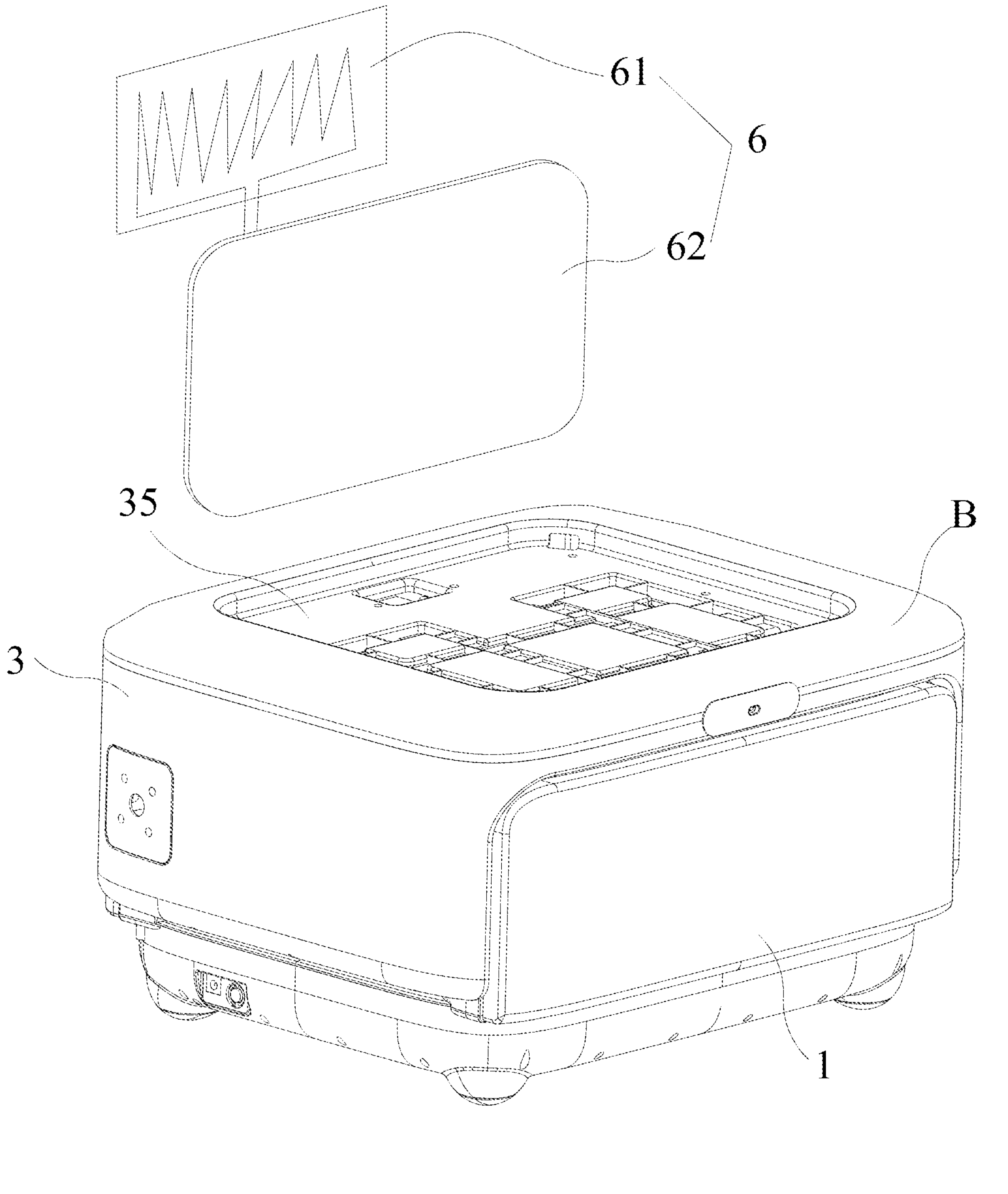
FIG. 2 is another schematic diagram of the three-dimensional structure of the present invention (showing the thermal therapy assembly)

Further, the massager according to the present invention also features a thermal therapy function. As shown in FIG. 2, a thermal therapy assembly 6 is provided on an outer side of the second housing 3 (i.e. rear wall surface of the back shell 32). The thermal therapy assembly 6 comprises a heating sheet 61 and a soft pad 62 provided on the outer side of the second housing 3, where the heating sheet 61 is positioned on the soft pad 62, and the heating sheet 61 will heat up when receiving heating instructions. A recess 35 is formed on the outer side of the second housing 3, specifically on the rear wall surface of the back shell 32. The recess 35 accommodates the soft pad 62; the soft pad 62 is made of sponge material, and the heating sheet 61 is placed on the soft pad 62, thus making the thermal therapy more comfortable. A cloth cover may be sleeved on the back shell 32 of the second housing 3. When thermal therapy is required, the relevant function button can be turned on, allowing the user to experience thermal therapy through the heated soft pad 62.

Further, when the user is receiving foot and leg massages when sitting in a reclined position, it is required to adjust the angles of the foot massage mechanism A and the leg massage mechanism B. As shown in FIGS. 3 and 6 to 10, a support frame 5 is rotatably connected to a bottom surface of the first housing 1; the support frame 5, when rotated outward away from the bottom surface of the first housing 1, supports the bottom surface of the first housing 1 with a tilted position with respect to the bottom surface of the first housing 1, so that the first housing 1 and the second housing 3 tilt backward with respect to a level ground; the support frame 5, when rotated inward towards the bottom surface of the first housing 1, is stored within the bottom surface of the first housing 1. A receiving recess 14 which accommodates the support frame 5 is formed on the bottom surface of the first housing 1, specifically on a bottom surface of the lower shell 12. Connection shaft sleeves 51 are provided at two ends of the support frame 5 respectively. In this embodiment, the support frame 5 comprises a U-shaped handle part 52, and the connection shaft sleeves 51 are provided at two ends of the handle part 52 respectively. Second rotational axles 141 that pass through the connection shaft sleeves 51 respectively are installed on two sides of a front part of the receiving recess 14 respectively. Two limiting protrusions 511 are formed on an outer circumferential surface of each of the connection shaft sleeves 51; stopping protrusions 142 are formed within the receiving recess 14 and are positioned adjacent and below the second rotational axles 141 respectively. One of the limiting protrusions 511 of each of the connection shaft sleeves 51 engage with an inner side surface or an outer side surface of a corresponding stopping protrusion 142 when the connection shaft sleeves 51 are rotated away from the bottom surface of the first housing 1 to achieve an inclined supporting position of the support frame 5 or rotated towards the bottom surface of the first housing 1 to achieve a storage position of the support frame 5 respectively, thereby achieving position limitation of the support frame 5 in such inclined supporting position and the storage position. The limiting protrusions 511 and the stopping protrusions 142 have arc-shaped contours to facilitate rotation of the support frame 5. The engagement between the limiting protrusions 511 and the corresponding stopping protrusions 142 allows a more stable support when the support frame 5 is rotated to the inclined supporting position and also prevents the support frame 5 from falling out when it is stored in the storage position, enabling it to be stored in the receiving recess 14.

When using the multi-functional massager of the present invention as a foot massager, the second housing 3 is rotated upward until it is positioned at a rear side of the first housing. The user then insert their feet into the two pockets 111 of the first housing 1, and both calves of the user rest in the two slots 31 of the second housing 3. By pressing the relevant buttons on the operating shell 34, foot and calf massages can be achieved. When it is required to adjust the placement angle of the massager, the support frame 5 can be rotated away from the bottom surface of the first housing 1 to tilt the entire massager. When massage is not required, the second housing 3 is rotated downward to close against the top side of the first housing 1, where the second housing 3 fits precisely on the first housing 1, thus transforming the entire massager into a footstool structure, thus reducing the storage volume while enabling the massager to serve as a footstool. Further, the second housing 3 of the massager also features a thermal therapy function. When thermal therapy is required, a relevant button can be pressed, allowing the user to experience thermal therapy by resting the feet, buttocks, or other body areas against the outer side of the second housing 3 (i.e. rear wall surface of the back shell 32).

The above embodiments and drawings are not intended to limit the form and style of the product of the present invention, and any suitable changes or modifications made by those of ordinary skill in the art shall fall within the patent scope of the present invention.

What is claimed is:

1. A multi-functional massager, comprising a foot massage mechanism configured for foot massage, and a leg massage mechanism configured for calf massage; wherein the foot massage mechanism comprises a foot massage assembly provided within a first housing of the massager to provide foot massage; the leg massage mechanism comprises two adjacent slots configured to accommodate legs of a user, and the two slots are formed within a second housing of the massager; massage airbags are provided in the slots; wherein two sides of the second housing are rotatably connected to two sides of the first housing; the second housing, when rotated upward, stands vertically at a rear end of the first housing and being positioned perpendicularly with respect to the first housing; the second housing, when rotated downward, is horizontally positioned and closed against a top side of the first housing; a thermal therapy assembly is provided on an outer side of the second housing; the first housing comprises an upper shell, a lower shell, and a middle shell placed above the lower shell; two pockets configured for user's feet to enter are formed on a top surface of the upper shell; two openings are provided on a surface of the middle shell corresponding to the pockets; the foot massage assembly is positioned within the lower shell, and two massage head sets are provided in the foot massage assembly and are positioned under the two openings respectively;

the foot massage assembly comprises a driving unit and said two massage head sets; the driving unit comprises a motor and a gear set driving a rotating shaft to rotate; rotating wheels are installed at two ends of the rotating shaft respectively; the rotating wheels are rotatable along with the rotating shaft; an eccentric cam is eccentrically provided each of the rotating wheels and projected out of the rotating wheel; each of the massage he sets comprises a front massage head and a rear massage head, which are positioned respectively on two opposite sides of the rotating shaft; massage arms where the front massage head and the rear massage head are installed respectively sleeve onto eccentric cam; sliding grooves are formed at lower edges of the front massage head and the rear massage head respectively in each massage head set, and limiting shafts are provided on the lower shell, and the limiting shafts pass through the sliding grooves respectively; the front massage head of each massage head set is driven to perform back-and-forth movement under constraint of the corresponding limiting shaft; the rear massage head of each massage head set is driven to perform a compound motion of back-and-forth movement and up-and-down motion under constraint of the corresponding limiting shafts.

2. The multi-functional massager of claim 1, wherein a support frame is rotatably connected to a bottom surface of the first housing; the support frame, when rotated outward away from the bottom surface of the first housing, supports the bottom surface of the first housing with a tilted position with respect to the bottom surface of the first housing, so that the first housing and the second housing tilt backward with respect to a level ground; the support frame, when rotated inward towards the bottom surface of the first housing, is stored within the bottom surface of the first housing.

3. The multi-functional massager of claim 2, wherein a receiving recess which accommodates the support frame is formed on the bottom surface of the first housing; connection shaft sleeves are provided at two ends of the support frame respectively; rotational axles that pass through the connection shaft sleeves respectively are installed on two sides of a front part of the receiving recess respectively; two limiting protrusions are formed on an outer circumferential surface of each of the connection shaft sleeves; stopping protrusions are formed within the receiving recess and are positioned adjacent and below the rotational axles respectively; one of the limiting protrusions of each of the connection shaft sleeves engage with an inner side surface or an outer side surface of a corresponding stopping protrusion when the connection shaft sleeves are rotated away from the bottom surface of the first housing to achieve an inclined supporting position of the support frame or rotated towards the bottom surface of the first housing to achieve a storage position of the support frame respectively, thereby achieving position limitation of the support frame in the inclined supporting position and the storage position.

4. The multi-functional massager of claim 3, wherein the support frame comprises a U-shaped handle part, and the connection shaft sleeves are provided at two ends of the handle part respectively; the limiting protrusions and the stopping protrusions have arc-shaped contours.

5. The multi-functional massager of claim 1, wherein an operating shell is provided in a middle of the second housing, and the two slots are formed at two sides of the operating shell respectively; a receiving groove is formed in a middle of the upper shell of the first housing between the two pockets; the operating shell of the second housing fits into the receiving groove when the second housing is closed against the top side of the first housing.

6. The multi-functional massager of claim 5, wherein the second housing comprises a back shell, and side shells extending perpendicularly from two ends of the back shell; inner walls of the side shells of the second housing are rotatably connected to two side walls of the upper shell of the first housing; the back shell of the second housing is positioned on a rear side of the upper shell when the second housing is rotated upright; the back shell of the second housing is positioned above the upper shell and closes against the upper shell when the second housing is rotated downward and closes against the top side of the first housing.

7. The multi-functional massager of claim 6, wherein the massage airbags provided for each of the slots comprise a back airbag provided on a front wall surface of the back shell, and side airbags provided on an inner wall of a corresponding side shell and a corresponding side wall of the operating shell.

8. The multi-functional massager of claim 1, wherein the thermal therapy assembly comprises a heating sheet and a soft pad provided on the outer side of the second housing, where the heating sheet is positioned on the soft pad.

* * * * *